United States Patent [19]

Graf

[11] Patent Number: 4,654,944

[45] Date of Patent: Apr. 7, 1987

[54] OVERHEAD CAM VALVE SPRING COMPRESSOR ADAPTER

[76] Inventor: Richard W. Graf, 3 Jericho Rd., Box 5279, Clinton, N.J. 08809

[21] Appl. No.: 775,630

[22] Filed: Sep. 13, 1985

[51] Int. Cl.[4] .............................................. B23P 19/04

[52] U.S. Cl. .............................................. 29/217; 29/229

[58] Field of Search .................. 29/215, 216, 217, 218, 29/219, 220, 221, 229; 254/10.5

[56] References Cited

U.S. PATENT DOCUMENTS

| | | | |
|---|---|---|---|
| 1,656,974 | 1/1928 | Dorman | 29/215 |
| 1,685,548 | 9/1928 | Housley et al. | 29/218 |
| 1,826,908 | 10/1931 | Wainwright | 29/215 |
| 1,862,793 | 6/1932 | Kulp . | |
| 1,913,084 | 6/1933 | Kulp . | |
| 1,934,973 | 11/1933 | Frye | 29/221 |
| 2,566,460 | 9/1951 | Mihalic | 29/215 |
| 4,176,435 | 12/1979 | Castone . | |
| 4,267,627 | 5/1981 | Douglas | 29/217 |

*Primary Examiner*—Robert C. Watson

*Attorney, Agent, or Firm*—Ostrolenk, Faber, Gerb & Soffen

[57] ABSTRACT

A generally cylindrical adapter which may be used with a conventional C-clamp valve spring compressor is made of a material such as nylon which will not scratch the cam follower bore of an overhead cam engine. The adapter has a groove in its upper portion for connecting to the jaw assembly of the C-clamp compressor, and has a flat annular lower end face for applying the compressing force from the C-clamp compressor to the valve spring assembly. As the compressing force is applied, the valve stem will be received in a central axial opening in the adapter, until the collets become accessible through lateral openings or access ports in the lower portion of the adapter. The collets may thus be removed through the lateral openings for disassembly of the valve spring assembly or may be returned to the valve stem through the lateral openings for reassembly. The adapter provides sufficient clearance so that the C-clamp compressor may be used to compress the valve spring of an overhead cam engine.

15 Claims, 7 Drawing Figures

FIG. 5.
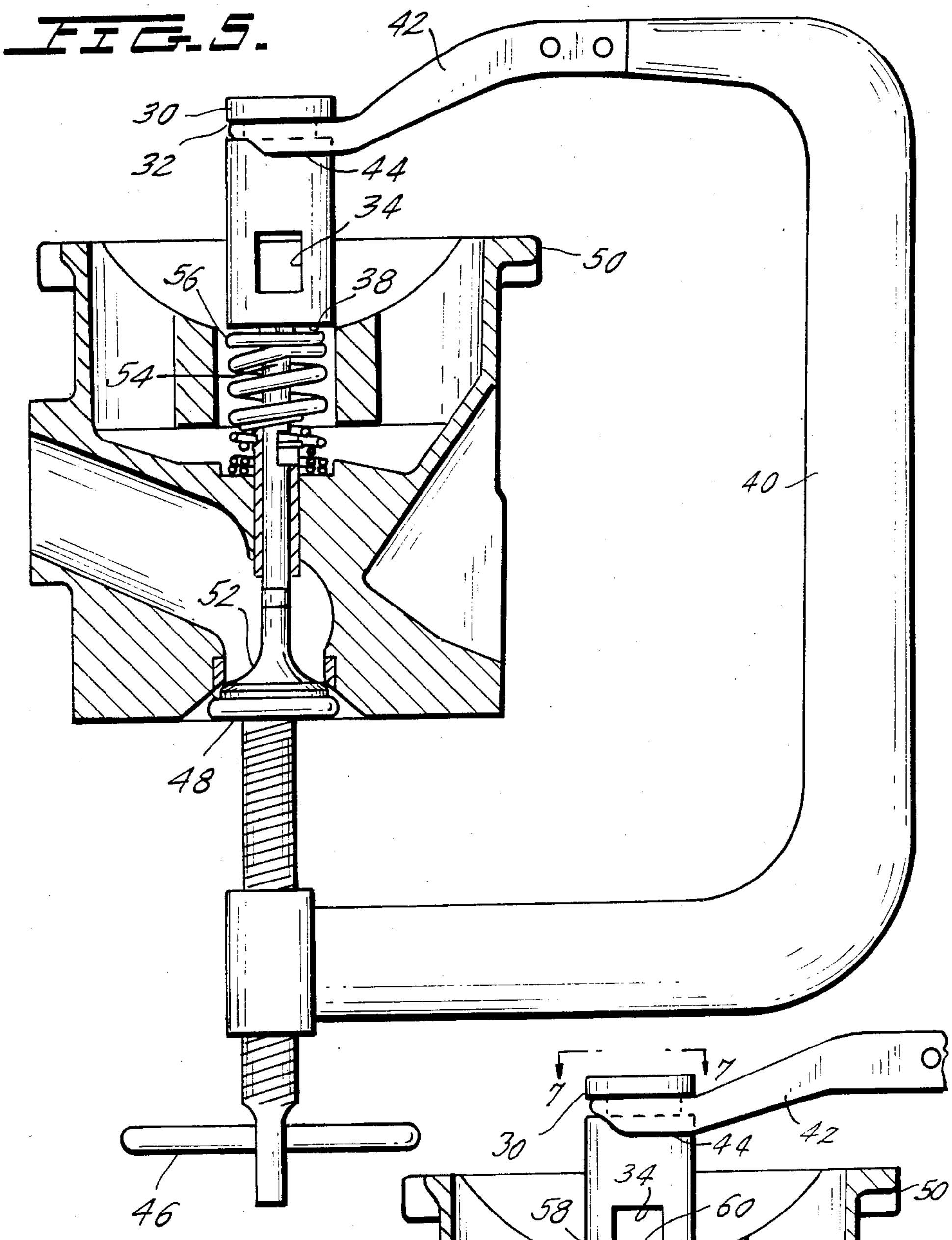
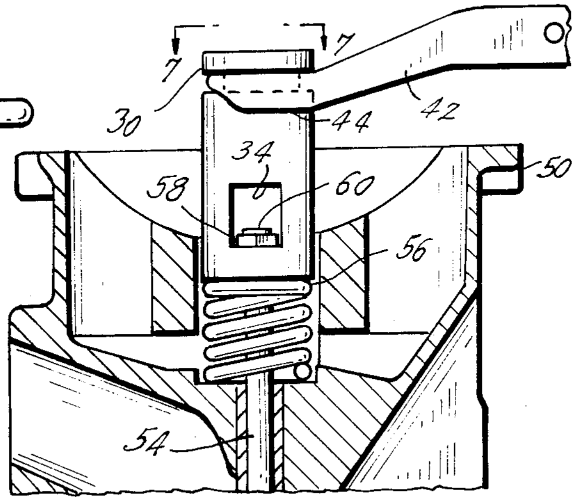
FIG. 6.

OVERHEAD CAM VALVE SPRING COMPRESSOR ADAPTER

BACKGROUND OF THE INVENTION

The present invention relates to an adapter for use in compressing the valve springs of an internal combustion engine. More specifically, the present invention relates to an adapter which makes it possible to compress the valve springs of an overhead cam engine using a C-clamp.

On older engines, the valve springs typically extend upward from the upper surface of the engine cylinder head. Therefore, the valve springs may be compressed for the purpose of removing the valve assembly or for other purposes using a conventional C-clamp compressor of the type described, for example, in U.S. Pat. 1,862,793 and 1,913,084, incorporated herein by reference.

More recently, in overhead cam engines, the valve springs are frequently surrounded by a structure which precludes the use of the conventional C-clamp compressor. As a result, tools like that shown in U.S. Pat. No. 4,176,435 have appeared, in which a crossbar is first mounted on the cylinder head permitting use of a leverage arm or pry bar with a metal sleeve on the leverage arm engaging the valve spring assembly and compressing it as a force is applied to the leverage arm. The arrangement shown in U.S. Patent 4,176,435 is for the purpose of removing a rocker arm, but a similar arrangement is also known with openings at each side of the sleeve to permit removal of the collets which hold the valve spring retainer and the valve spring in place. This arrangement, however, requires a special crossbar or similar jig for each type of cylinder head, so that if several types of engines are being repaired, it will be necessary to have several types of crossbars on hand. Furthermore, since the spacing of the sleeve from the end of the lever arm is fixed, it may be necessary to have more than one lever arm as well.

It would be advantageous to have a technique for compressing the valve spring of an overhead cam engine which would not require a special crossbar or tool for each engine, but which could be used with many different types of cylinder heads. It would also be advantageous to provide a technique which would not risk scoring or scratching the cam tappet bore in the cylinder head by a metal sleeve.

SUMMARY OF THE INVENTION

The present invention provides a technique for compressing a valve spring which makes it unnecessary to use a crossbar or similar jig or to use a lever arm with a sleeve mounted on it. Therefore, the present invention provides a technique for compressing a valve spring which does not require that several different sets of tools be kept for different engines. Furthermore, the present invention provides such a technique which will avoid scoring or scratching the cam tappet bore in the cylinder head.

The present invention provides an adapter for a C-clamp valve spring compressor. The adapter includes a member with an upper portion for receiving a compressing force from the C-clamp compressor and with an opposite lower portion with a lower end face for engaging a valve spring assembly. Means are provided on the upper portion for connecting to the C-clamp compressor. The member has a central opening extending from the lower end face toward the upper portion for receiving a valve stem as the valve spring assembly is compressed, and also has at least one lateral opening defined in the lower portion and connecting to the central opening for permitting access to the valve stem.

The member preferably is made of material which is incapable of scratching a metal surface of the cylinder head in which the valve spring assembly is mounted. For example, the member may be a plastic such as nylon.

One application of the adapter of the invention is to compress the valve spring assembly to permit removal of the collets from the valve stem so that the valve itself may be subsequently removed. For this purpose, the central opening has a circular crosssection which is greater in diameter than the effective diameter of the collets. Similarly, two of the lateral openings may be provided for permitting access on opposite sides of the valve stem, making it possible to remove both collets from the valve spring assembly.

The member may have a generally cylindrical outer surface centered about an axis, which is also the axis of the central opening. The central opening may extend along this axis from the lower end face to the upper end face of the member, and the lower end face may have a flat annular surface in a plane perpendicular to the axis around the central opening. The lateral opening may be spaced apart from the lower end face. The means for connecting to the C-clamp may comprise an annular groove defined in the outer surface of the upper end portion of the member for receiving the jaws of the C-clamp.

The present invention thus provides an adapter which can be used with a conventional C-clamp valve spring compressor in order to compress a valve spring assembly of an overhead cam engine. Because the conventional C-clamp provides the necessary compressing force, no additional crossbar or other jig is required to be connected to the cylinder head. Furthermore, no lever or lever arm is necessary. In addition, the material from which the adapter is made avoids damage to the cylinder head.

Other objects, features and advantages of the invention will become apparent from the following description of the preferred embodiments of the invention, considered in conjunction with the accompanying drawings and the appended claims.

BRIEF DESCRIPTION OF THE DRAWINGS

FIG. 5 is a partial cross-sectional view of a cylinder head showing the adapter according to the present invention held on a C-clamp compressor in the uncompressed position.

FIG. 6 is a detail from FIG. 5 showing the adapter in the compressed position.

DETAILED DESCRIPTION OF THE PREFERRED EMBODIMENTS

Figure 1:
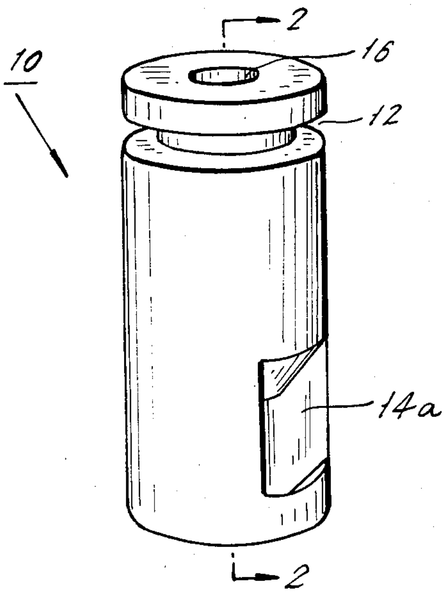
FIG. 1 is a perspective side view of an adapter according to the present invention.
Figure 2:
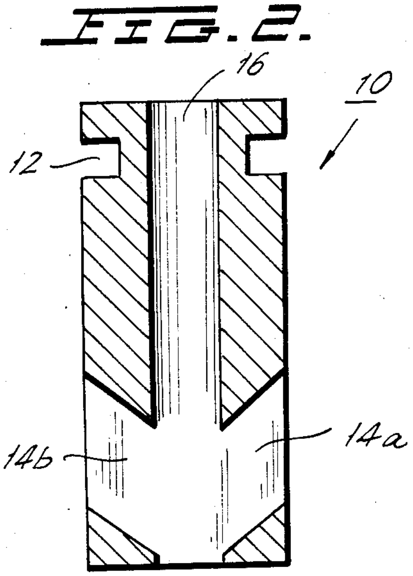
FIG. 2 is a cross-sectional view of the adapter of FIG. 1 taken along the line 2—2.

FIGS. 1 and 2 show adapter 10 according to one embodiment of the present invention. As shown in FIGS. 1 and 2, adapter 10 includes a single member with a groove 12 defined in its upper portion and lateral openings 14*a* and 14*b* defined in its lower portion. The upper portion of adapter 10 receives a compressing force from a C-clamp compressor, and groove 12 serves as means for connecting to the C-clamp compressor by receiving a pair of jaws of the C-clamp compressor, as discussed in greater detail below. The lower end face of the lower portion of adapter 10 engages a valve spring assembly which is then compressed by application of the compressing force, and adapter 10 also has a central opening 16 extending from the lower end face to the upper end face which receives a valve stem of the valve spring assembly as it is compressed. Lateral openings 14*a* and 14*b* connect through to central opening 16 so that when the valve stem extends into central opening 16, it becomes accessible through lateral openings 14*a* and 14*b*.

From FIGS. 1 and 2, it can be seen that adapter 10 has a generally cylindrical outer surface, and that groove 12 is an annular groove defined in the outer surface of the adapter 10. Similarly, the lower end face of adapter 10 will have a flat annular surface around the central opening extending in a plane perpendicular to the axis of the cylindrical outer surface of adapter 10. The central opening 16 has a circular cross-section and is centered around the same axis as the outer surface of adapter 10.

Figure 4:
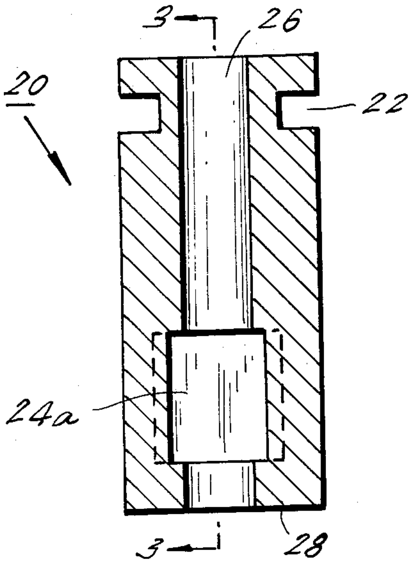
FIG. 4 is across-sectional view of the adapter of FIG. 3 taken along the line 4—4.
Figure 3:
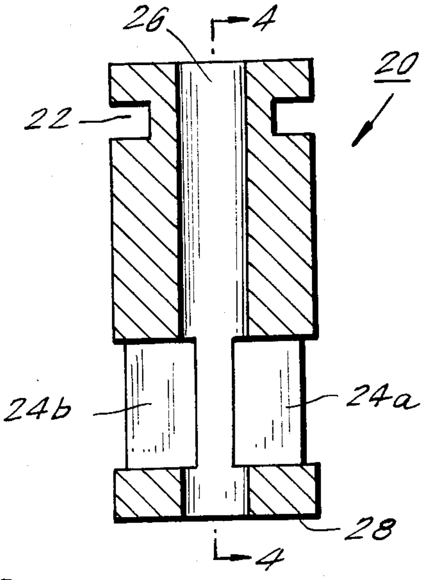
FIG. 3 is a cross-sectional view of another embodiment of the adapter according to the present invention.

FIGS. 3 and 4 are cross-sectional views showing the structure of another embodiment of the present invention. FIG. 3, a cross-section taken along the line 3—3 in FIG. 4 shows adapter 20, again with groove 22 formed in its upper portion. Lateral openings 24*a* and 24*b* are opposite each other in positions which permit access to opposite sides of the valve stem for inserting and removing valve collets which hold the valve assembly, including a valve spring, spring retainer, valve stem and the collets themselves in position. Rather than being obliquely oriented, like lateral openings 14*a* and 14*b* in FIGS. 1 and 2, however, lateral openings 24*a* and 24*b* are substantially perpendicular to the axis of adapter 20, and connect with axial central opening 26, which has a circular crosssection. The lower end face 28 of adapter 20 is once again a flat annular surface around central opening 26 in a plane perpendicular to the axis of adapter 20. Lateral openings 24*a* and 24*b* are spaced apart from lower end face 28.

From FIGS. 3 and 4, the manner in which adapter 20 may be manufactured can be easily understood. Adapter 20 is preferably made from a material which is incapable of scratching the metal surfaces around the valve assembly in the cylinder head, which may specifically be soft aluminum cam follower bores. Therefore, adapter 20 may, for example, be made of a plastic such as nylon. Such a material is especially advantageous in a machine shop because it will not rust and will not be bent or otherwise deformed due to ordinary handling. The generally cylindrical outer surface of adapter 20 may be formed on a lathe, and central opening 26 may be obtained by drilling. Groove 22 may also be formed on a lathe, while lateral openings 24*a* and 24*b* may be cut by making a dish-shaped cut in the outer surface of adapter 20 which extends to the central opening 26. Alternatively, lateral openings like openings shown in FIGS. 1 and 2 could be formed by a different sort of cutting process.

Rather than being produced by machining, the adapter of the present invention could be produced in quantity by molding. In addition, although FIGS. 1–4 show two variations in the shapes of the lateral openings, the lateral openings could take various other shapes, and could actually extend to the lower end face of the adapter to accommodate a rocker arm, although this would result in a somewhat weaker structure than the embodiments shown in FIGS. 1–4. It should be pointed out, however, that the tilted lateral openings 14*a* and 14*b* shown in FIGS. 1 and 2 allow better visibility from above.

In addition to the above variations, the adapter could also be formed as a part of the C-clamp compressor, and could be integral with the adjacent part of the C-clamp or could be connected by other means to the C-clamp. The adapter of the present invention, however, is especially advantageous because it permits temporary use of the adapter with a conventional C-clamp compressor, as discussed in greater detail below. The conventional C-clamp compressor is commonly found in shops in which cylinder head work is performed, and also continues to be useful for working on many cylinder heads which do not have overhead cams.

Figure 7:
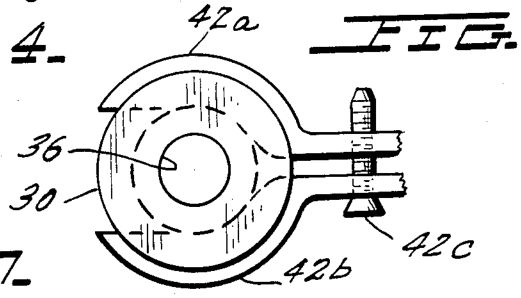
FIG. 7 is a top view taken along the lines 7—7 in FIG. 6 showing the positioning of the adapter in the jaws of the C-clamp compressor.

FIGS. 5 and 6 illustrate the use of an adapter 30 according to the present invention with a C-clamp valve spring compressor 40 and a cylinder head 50 in which a valve spring assembly is mounted. As shown in FIG. 5, the jaw assembly 42 fits into groove 32 in adapter 30, with flange 44 fitting around adapter 30 to provide added stability. FIG. 7, a detailed top view taken along the line 7—7 in FIG. 6, shows more clearly the components of jaw assembly 42. Jaw sides 42*a* and 42*b* each have a flattened area which can be fitted into groove 32, and which may be tightened together by tightening means 42*c*, which may be a screw or other appropriate tightener, to hold adapter 30 firmly in place. In addition, tightening means such as handle 46 are provided on C-clamp 40 to tighten pad 48 against valve 52 in cylinder head 50. In the uncompressed position shown in FIG. 5, no part of the valve spring assembly is visible through lateral opening 34, and the lower end face 38 of adapter 30 is not in contact with the valve spring assembly. The valve spring assembly includes valve spring 54 around the stem of valve 52 and valve retainer 56 at the top of valve spring 54.

When the compressing force is applied, as shown in FIG. 6, the lower end face 38 of adapter 30 is brought against retainer 56, bringing the upper end 60 of the valve stem into view through lateral opening 34. Just below the upper end 60 are the two semicircular collets conventionally used to lock retainer 56 in position by fitting into one or more grooves in the valve stem below the upper end 60. In the compressed position shown in FIG. 5, however, the valve spring 54 is compressed, while the stem of valve 52 extends to a position in which the collets 58 may be removed or, after the operation is completed, replaced. When collets 58 are removed, retainer 56 is not held by the upper end 60, so that it permits valve 52 to be removed from the head. As a result, the necessary mechanical work may be performed, and then valve 52 may be replaced, valve spring 54 may be compressed, and collets 58 may be reinserted to complete assembly.

Without adapter 30, C-clamp compressor 40 would be incapable of compressing valve spring 54, since, as shown most clearly in FIG. 5, the upper end of valve spring 54, held in place by the retainer 56, is positioned within a cam follower bore in cylinder head 50. Even though flange 44 and the tightening means shown in FIG. 7 for the jaw assembly 42 would otherwise permit jaw assembly 42 to fit over the upper end of valve spring 54, the positioning of valve spring 54 within a bore or other recess on the cylinder head 50 makes this impossible.

As will be readily understood from FIGS. 5 and 6, the sizes of the various parts of the valve spring assembly in the cylinder head 50 may vary from engine to engine. Therefore, it may be necessary to provide more than one type of adapter 30 for use on various engines. Only a few sizes of adapters should be necessary, however, because the dimensions of the adapter allow a wide range of tolerance. It is best if the diameter of the adapter is slightly less than the diameter of the cam follower bore within which it fits, but it could be somewhat smaller, provided that the central opening is large enough for the valve stem and the collets and further provided that the lateral openings or valve collet access ports are positioned so that the valve collets are accessible when the valve spring is fully compressed. Of greater importance is the height of the adapter between its lower end face and the groove or other means for connecting to the C-clamp compressor. This height must be sufficient to permit the C-clamp compressor to clear the adjacent parts of cylinder head 50 even when fully compressed to the position necessary to remove the collets or perform other operations. When this position is reached, the collets may be pulled through the valve collet access ports using magnets, for example, and may be replaced similarly.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. In combination with a C-clamp valve spring compressor having a bifurcated jaw.

an adapter for adapting said compressor to extend into a bore in a cylinder head, said adapter comprising:

a member having an upper portion for receiving a compressing force from a C-clamp compressor and an opposite lower portion with a lower end face for engaging a valve spring assembly to be compressed by the compressing force;

means on the upper portion of the member for connecting to the C-clamp compressor, including means for receiving said bifurcated jaw of said C-clamp compressor; the means for receiving the bifurcated jaw comprising a groove formed in the outer surface of the upper portion of the member for receiving, and coacting with, said bifurcated jaw for securing the adapter against relative motion of the member with respect to the jaw; the jaw-receiving means being configured for being removably and replaceably fitted to said bifurcated jaw;

the member having a central opening defined therein extending from the lower end face toward the upper portion for receiving a valve stem of the valve spring assembly as the valve spring assembly is compressed; the member further having at least one lateral opening defined in the lower portion and connecting to the central opening for permitting access to the valve stem.

2. The adapter of claim 1 in which the member comprises a material which is incapable of scratching a metal surface of a cylinder head in which the valve spring assembly is mounted.

3. The adapter of claim 1 in which the member is plastic.

4. The adapter of claim 1 in which the central opening has a circular cross-section with a diameter greater than the effective diameter of collets mounted on the valve stem.

5. The adapter of claim 1 in which the member has two of the lateral openings defined therein and positioned for permitting access on opposite sides of the valve stem.

6. The adapter of claim 1 in which the member has a generally cylindrical outer surface centered about an axis extending from the lower portion through the upper portion.

7. The adapter of claim 6 in which the central opening has a circular cross-section centered about the axis.

8. The adapter of claim 7 in which the upper portion has an upper end face disposed away from the lower end face, the central opening extending from the lower end face to the upper end face.

9. The adapter of claim 7 in which the lower end face has a flat annular surface around the central opening and extending in a plane perpendicular to the axis.

10. The adapter of claim 6 in which the lateral opening is defined in the outer surface of the lower portion of the member at a position spaced apart from the lower end face.

11. The adapter of claim 1 in which the adapter is secured substantially perpendicular to the bifurcated 12. The adapter of claim 1 in which the member has a longitudinal axis and the jaw receiving means configured for securing the member to the bifurcated jaw with said longitudinal axis substantially fixed with respect to the jaw.

13. The adapter of claim 12 in which the member is secured substantially perpendicular to the jaw.

14. The adapter of claim 12 in which said valve spring assembly is compressed by such compressing force exerted in a direction substantially along the longitudinal axis of the member.

15. The adapter of claim 14 in which the lower end face of the member engages the valve spring assembly in said direction without substantial damage to a cylinder head in which the valve spring assembly is mounted.

* * * * *